United States Patent [19]
Freudenschuss et al.

[11] 3,932,742
[45] Jan. 13, 1976

[54] LOAD-CONTROL SYSTEM RESPONSIVE TO OPERATING CONDITION OF PRODUCER OF INTERMITTENT RADIATION

[75] Inventors: Otto Freudenschuss, Vienna; Herbert Krammer, Hinterbruhl; Robert Scheiber, Vienna, all of Austria

[73] Assignees: Karl Vockenhuber; Raimund Hauser, both of Vienna, Austria

[22] Filed: Mar. 7, 1973

[21] Appl. No.: 339,024

[30] Foreign Application Priority Data
Mar. 9, 1972   Austria .............................. 1955/72

[52] U.S. Cl. ......... 250/199; 178/DIG. 15; 315/150; 315/159; 325/394
[51] Int. Cl.² ............................................ H04B 9/00
[58] Field of Search ........... 250/199, 200, 201, 205, 250/206, 336; 178/DIG. 15; 325/390, 392, 325/394; 315/150, 158, 159; 307/96, 117; 240/DIG. 6

[56] References Cited
UNITED STATES PATENTS

| | | | |
|---|---|---|---|
| 2,992,412 | 7/1961 | Spindler | 178/DIG. 15 |
| 3,444,544 | 5/1969 | Pearson et al. | 250/199 |
| 3,475,092 | 10/1969 | Harvey | 250/199 |
| 3,534,351 | 10/1970 | Harnden et al. | 250/199 |
| 3,573,463 | 4/1971 | Goodwin | 250/199 |
| 3,639,841 | 2/1972 | Richardson | 325/363 |
| 3,727,061 | 4/1973 | Dworkin | 250/199 |
| 3,748,591 | 7/1973 | Visioli, Jr. et al. | 250/206 |

OTHER PUBLICATIONS
"Transistor Physics and Circuits" (pp. 288–293) by Riddle & Ristenbatt, 1958.

*Primary Examiner*—Benedict V. Safourek
*Assistant Examiner*—Jin F. Ng
*Attorney, Agent, or Firm*—Ernest G. Montague; Karl F. Ross; Herbert Dubno

[57] ABSTRACT

The operating condition of a producer of intermittent radiation, such as a motion-picture projector or a television receiver, is monitored by a detector circuit including a photoelectric transducer followed by a filter with a pass band centered on the interruption frequency. The detector output is used to control the lighting of a lamp or the drawing of a curtain in a room where ambient illumination is to be suppressed or reduced during operation of the monitored apparatus. In one embodiment, the band-pass filter is inserted in a negative-feedback loop which suppresses the frequencies falling within its pass band. A band-stop filter may be connected in cascade with the band-pass filter to block the passage of signals due to other radiation such as ambient artificial light.

13 Claims, 6 Drawing Figures

LOAD-CONTROL SYSTEM RESPONSIVE TO OPERATING CONDITION OF PRODUCER OF INTERMITTENT RADIATION

BACKGROUND OF THE INVENTION

The invention relates to a detecting and controlling appliance to be used with wave-emitting image-reproducing apparatus which can be used for switching an intermission light and controlling curtains or the like between performances of the image-reproducing apparatus. The appliance responds to the radiation, which may for example be light, ultrasonics or the like.

Conventionally the intermission light, the curtain or the like may be switched on or off, for example steplessly, by an operator. It is also known for narrow-gauge-film projectors to be provided with an intermission-light lamp on the apparatus itself, the lamp being controlled by the mode-selection switch of the apparatus. This avoids the need for a separate operator. The difficulty, however, is that such apparatus must be constructed in accordance with the different safety regulations for electrical apparatus which are in force in different countries. It is clear that this presents problems for mass-production of such equipment. The use of markings on the film for triggering control functions is also known, but this is impraticable with unmarked films and with television apparatus.

OBJECTS OF THE INVENTION

The general object of our invention, therefore, is to provide improved means for controlling a load in response to changes in the operating condition of a producer of intermittent radiation interrupted at a predetermined frequency.

More particularly, our invention aims at controlling ambient illumination in a room in which periodically interrupted light waves are generated by an image-reproducing apparatus such as a motion-picture projector or a television receiver.

SUMMARY OF THE INVENTION

These objects are realized, in accordance with our present invention, by the provision of radiation-detecting means positioned in the path of the intermittent radiation to be monitored, more particularly a photoelectric transducer followed by a frequency discriminator responsive to the frequency of interruption of the incident light waves for generating or increasing an output current in the unoperated condition of the image producer for the actuation of associated load-control means.

According to a more specific feature of our invention, the frequency discriminator comprises a band-pass filter whose pass band includes the frequency of interruption of the incident light waves, such as the flicker frequency of a film projector or television receiver. The output of this band-pass filter may be applied to the load-control means via a signal inverter so that the load circuit is not energized as long as the flicker frequency is present in the transducer input; alternatively, the band-pass filter may be inserted in a negative-feedback loop which suppresses the input frequencies falling within the pass band of the filter.

Where the producer of periodically interrupted light waves is located in a room which is subject to artificial ambient illumination from a source of light energized by an alternating supply voltage of a predetermined mains frequency, a band-stop filter is advantageously connected in cascade with the band-pass filter to eliminate extraneous frequencies including the modulation frequency (equal to twice the mains frequency) of this ambient illumination.

In the preferred field of application of our present invention the load actuated by our monitoring system controls the illumination of the room, either by switching a lamp on and off or by drawing and raising a blackout curtain. In some instances the room light need not be completely extinguished during performance; thus, if the image reproducer is a television receiver, dimming of the ambient illumination will usually be sufficient.

BRIEF DESCRIPTION OF THE DRAWING

The above and other features of our invention will now be described in detail with reference to the accompanying drawing in which.

DESCRIPTION OF THE PREFERRED EMBODIMENTS

Figure 1:
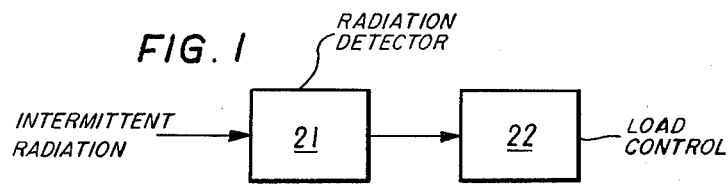
FIG. 1 is a general block diagram of a system embodying our invention.

In the simplest case a system embodying our invention may be constructed as an independent monitoring device to which a load such as the motor for a blackout curtain for a window of a room may be connected. Such a device will then comprise, as shown in FIG. 1, a detector unit 21 which incorporates a filter and a photoelectric transducer for providing electrical signals from the incident radiation, the suitably amplified filter output being fed to a controller 22, for the load current.

Figure 2:
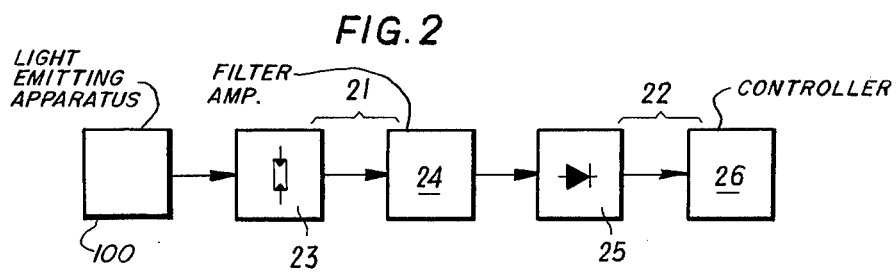
FIG. 2 is a more detailed block diagram particularly relating to a system in which the monitored radiation are light waves.

Such a monitoring device may be used both for narrow-gauge-film projectors as well as for television receivers if the flicker light emitted by such image-reproduction apparatus is utilized for recognizing its operating state of the apparatus. An apparatus of this nature has been diagrammatically represented at 100 in FIG. 2 where the unit 21 comprises a photoelectric transducer 23 and a frequency discriminator in the form of a filter-amplifier 24 which may be either a band-stop or a band-pass filter. In the case of a band-stop filter the output thereof must be compared to the input, the presence of light of the flicker frequency to be detected being determined as a result of the appearance of a level difference. However, it is simpler to utilize a band-pass filter. The unit 22 comprises a rectifier system 25 and the control system proper 26; the system 25 converts the incoming pulse signal into a direct-current voltage.

Figure 3:
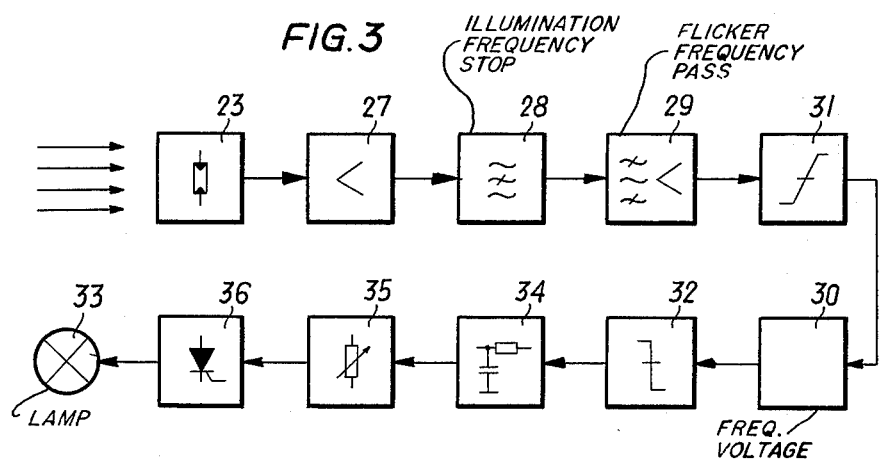
FIG. 3 is a more elaborate block diagram for a system of the type shown in FIG. 2.

In FIG. 3 the output of the photoelectric transducer 23 is connected to an amplifier 27 which is followed by a band-stop filter 28. Flicker light which does not originate from the monitored image-reproduction apparatus is filtered out by means of the band-stop filter 28. For example, the filter may have a stop band at twice the mains frequency so that flicker light originating from room illumination cannot interfere with the operation of the circuit.

The output of filter 28 is connected to a filter-amplifier 29 which comprises a band-pass filter with a gain factor. The bandwidth of filter 29 is preferably between 45 and 80 Hz so that all flicker frequencies which may be emitted by a narrow-gauge-film projector or television receiver are passed. The output of the filter-amplifier 29 is fed to a frequency-voltage converter 30 through a clipping amplifier 31, so that the signals obtained at the input of the converter 30 are independent of the image content. Accordingly, the amplifier-limiter 31 produces square-wave pulses from the signals supplied to it by the filter-amplifier 29, by switching to full operating voltage whenever the threshold value of the amplifier 31 is exceeded.

The frequency-voltage converter 30 is followed by a threshold switch 32 to prevent the frequency-voltage converter 30 from generating output signals which derive from isolated interference frequencies. The threshold switch 32 may be of the same basic construction as the amplifier-limiter 31. With the threshold turn 32 it is therefore possible to switch off a lamp 33, connected to the output of the detector in the presence of a flicker frequency which is derived from the image-producing apparatus. Normally, this switching-off operation would proceed relatively rapidly as soon as the limit of the threshold switch 32 is exceeded. However, smooth on/off switching is frequently desired. Accordingly, the output of the threshold switch 32 is connected to a time-constant network 34 which produces a corresponding delay for gradual illumination or extinction of the lamp 33.

The brightness of the lamp 33 may be additionally controlled by means of a regulator 35 which may contain an adjustable resistor. This may be achieved by steplessly varying the energization of the lamp 33 with the regulator 35 but a stepped change of brightness may also be achieved, for example by switching from one resistor to another. This is particularly desirable if the apparatus is to be used optionally for operation with narrow-gauge film projectors or with television receivers. While absolute darkness is desirable during operation of film projectors, the slight brightness of a "television lamp" is appropriate for the operation of television receivers. The changeover may be provided by the regulator 35, either manually or automatically.

In the last-mentioned case, the photoelectric transducer 23 or a separate radiation-responsive transducer may detect whether the light is emitted by a narrow-gauge-film projector or by a television apparatus. Differentiation may be provided by a spectral filter which precedes the photoelectric transducer 23 or by an electro-acoustic transducer which responds to the ultrasonic oscillations emitted by a television receiver. It is also possible to connect a narrow-band filter to the output of the photoelectric transducer 23, the filter being selective only for the flicker frequency which is emitted by a television receiver. The regulator 35 may then be switched from one resistance value to the other by means of the output of the aforementioned filter.

At the end of the chain illustrated in FIG. 3, the output signal emitted by the regulator 35 reaches a thyristor control circuit 36 for the lamp 33.

Figure 4A:
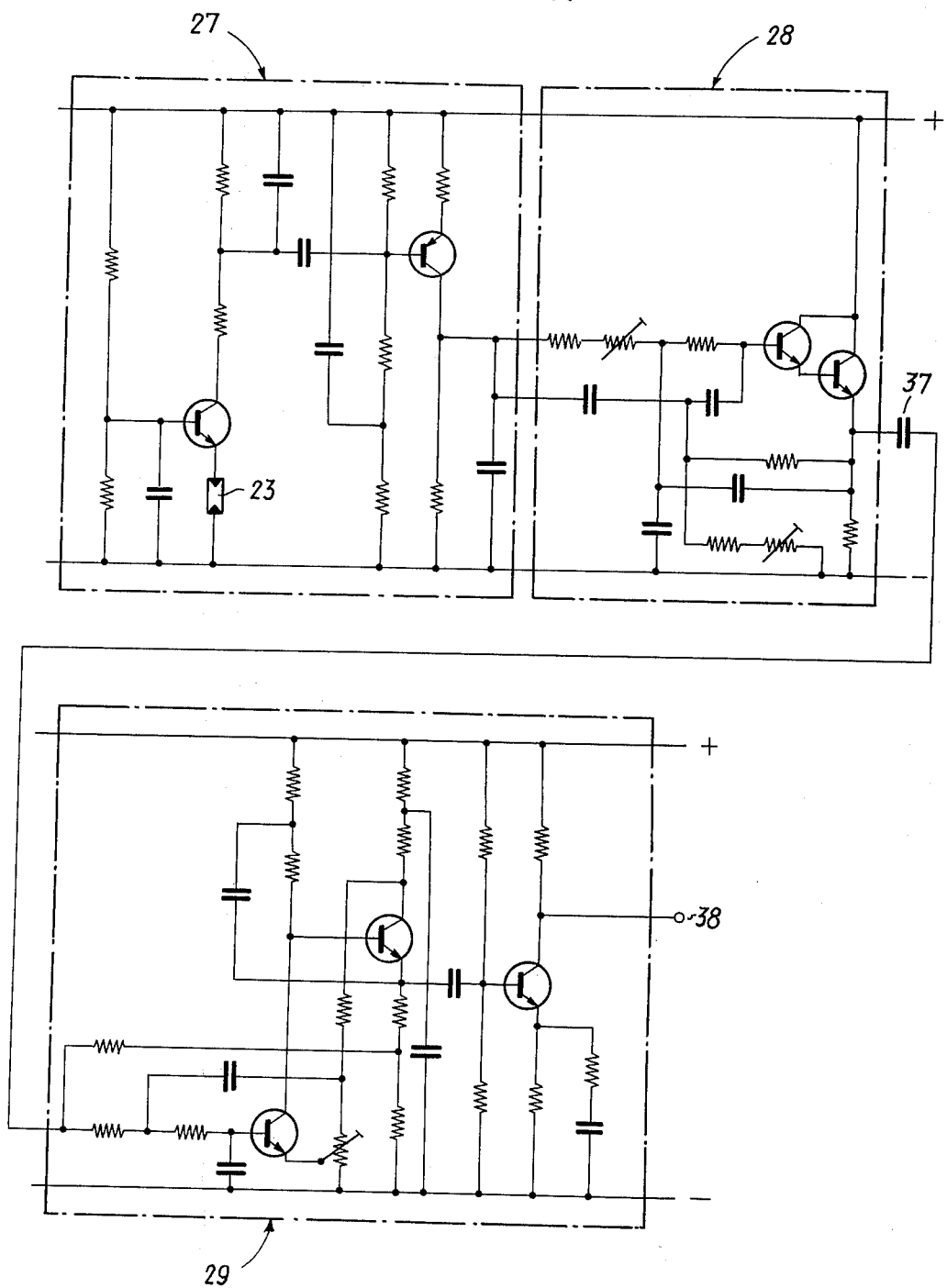
FIGS. 4A and 4B are circuit diagrams representing details of a modified system including some of the components of FIG. 3.
Figure 4B:
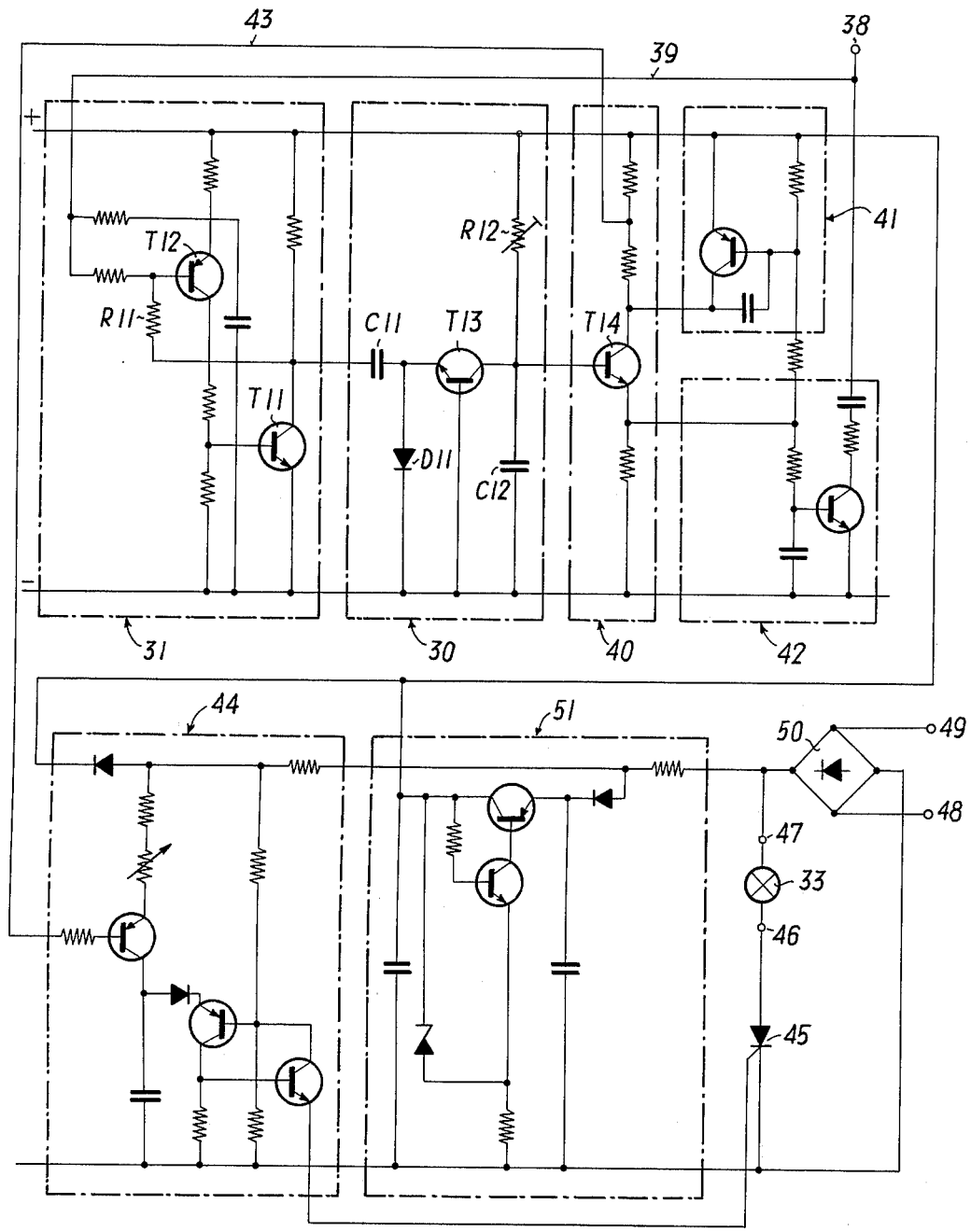

FIGS. 4A, 4B show specific circuitry for components of the system of FIG. 3. The photoelectric transducer 23 and the amplifier 27 are realized as a single module shown in FIG. 4A. The amplifier 27 also functions as a low-pass filter by means of which high frequencies which may originate from fluorescent tubes are suppressed. The output of the amplifier 27 is supplied to a band-stop filter 28 which may be constructed in conventional manner and may block frequencies of, for example, 100 Hz.

Figure 5:
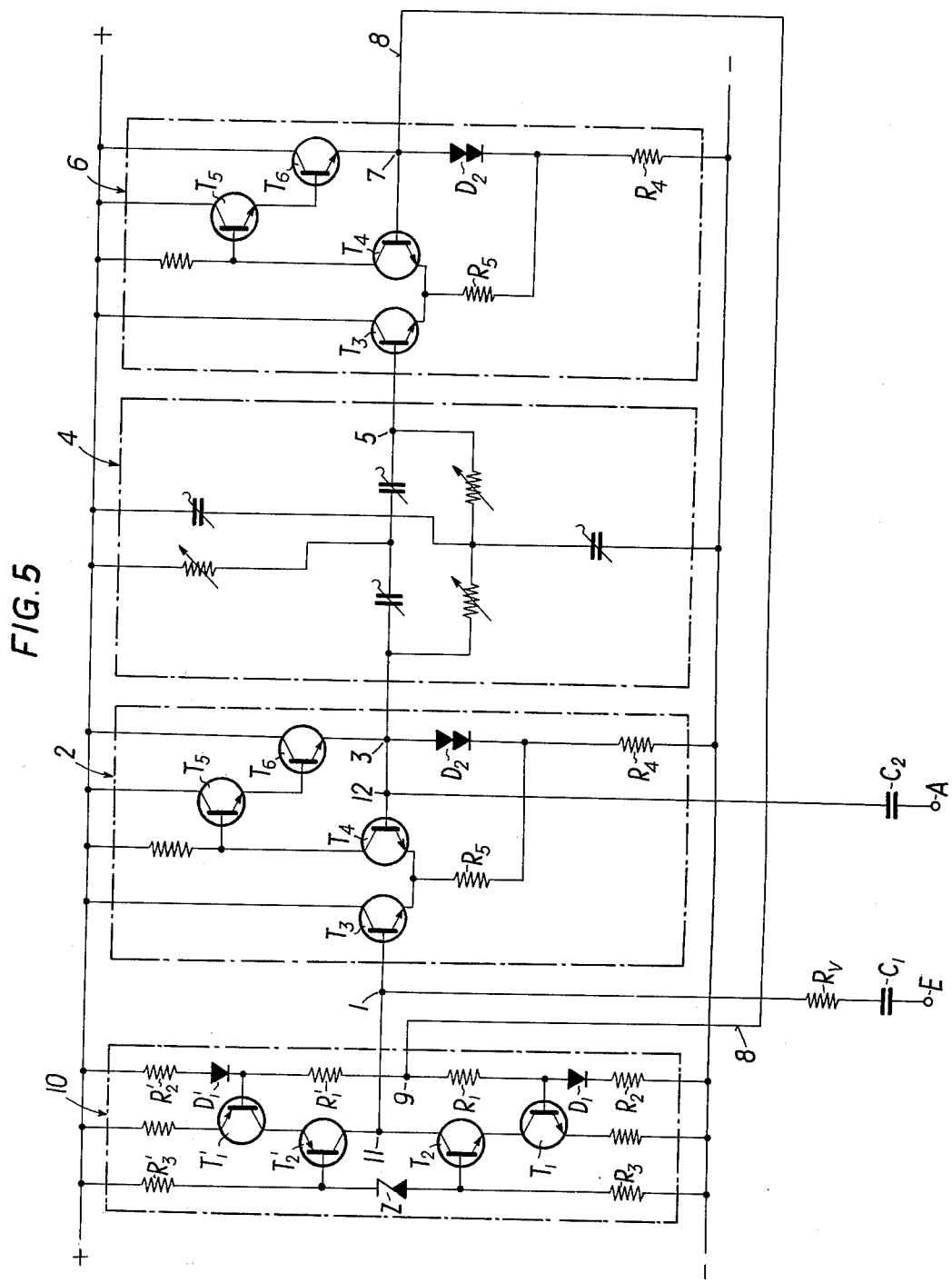
FIG. 5 is a circuit diagram of a frequency discriminator included in a system according to our invention.

The output signal of filter 28 passes into the filter-amplifier 29 via a coupling capacitor 37 for eliminating direct currents, the filter-amplifier 29 comprising a band-pass filter and an amplifier. The filter may be of basically conventional kind and may be of relatively wide-band characteristics for use in connection with narrow-gauge-film projectors and television receivers, having a bandwidth of approximately 45 to 80 Hz. However, if the monitoring system is to respond, for example, only to television receivers it will be necessary to employ a filter with a narrower bandwidth, for example a filter of the kind described hereinbelow with reference to FIG. 5. In each case, the output of the filter-amplifier 29 may be tapped off from a terminal 38 which is also shown in FIG. 4B.

From the terminal 38 (FIG. 4B) the signal passes via a conductor 39 to the threshold switch 31. This is a Schmitt trigger with a particularly narrow hysteresis which is obtained by virtue of feedback applied from the collector of an output transistor T 11 via a coupling resistor R 11 to the base of the input transistor T 12. The Schmitt trigger 31 functions as an amplifier-limiter which supplies uniform signals to the frequency-voltage converter 30 connected thereto, the magnitude of the signals depending solely on the operating voltage but not on the image content of the image displayed by the image-reproducing apparatus.

The frequency-voltage converter 30 comprises a transistor T 13 whose base is connected to one terminal of the voltage source. A resistor R 12, which may be adjustable, is connected to the collector of the transistor T 13. The resistor R 12 is connected to the other terminal of the voltage source.

The input of the frequency-voltage converter 30 includes a capacitor C 11, and at the converter output a storage capacitor C 12 which together with the resistor R 12 forms the RC network 34 (FIG. 3). Output capacitor C 12 has a substantially higher value than the input capacitor C 11, the capacitance ratio between these two capacitors corresponding to the ratio of the reciprocal of the monitored flicker frequency of the image-reproducing apparatus to the desired time constant within which the lamp 33 is to be illuminated or extinguished. Apart from this, the value of the resistor R 12 must be sufficiently large in order to provide the aforementioned time constant. The frequency-voltage converter 30 is completed by a rectifier in the form of a diode D 11 which is connected in anti-parallel relationship to the emitter-base circuit of the transistor T 13.

The charge of the output RC network C 12, R 12 is reduced by means of the transistor T 13 and is fed to the input capacitor C 11. The voltage which is not taken up by the input capacitor C 11 is diverted via the rectifier D 11. It is then merely necessary for the signal which remains at the output of the frequency-voltage converter 30 to be inverted in an inverting stage 40. The inverter 40 includes a transistor T 14 whose collector is connected to a pulse shaper 41, as the system described hereinabove would provide different switching-on and switching-off characteristics for the lamp 33. The pulse shaper 41 comprises a Miller capacitance.

A damping-selector switch 42 has one input connected to the terminal 38 and another input connected to the emitter of the transistor T 14 of the inverter 40 whose collector is connected via a conductor 43 to the input of a control stage 44 which in turn drives a thyristor 45. The thyristor 45 is connected in series with terminals 46, 47 to which the lamp 33 may be connected. If the appliance is constructed as a separate unit, any commercial lamp may be connected between terminals 46, 47.

It should be mentioned that the circuit is powered via terminals 48, 49 which may for example be connected to the mains. A diagrammatically indicated bridge rectifier 50, whose output is connected to the terminal 47 in parallel with a voltage-supply unit 51, is energized from the terminals 48, 49.

As may be seen it is possible to dispense with the threshold switch 32 and the separate timing element 34 if the arrangement of FIGS. 4A, 4B is used. The damping-selector switch 42 is provided to select the sensitivity which is increased in the presence of signals which are emitted by an image-reproducing apparatus.

As already mentioned, the filter-amplifier 29 may be replaced by a band-pass filter having a substantially narrower pass band. A particularly advantageous construction of such a filter will be described with reference to FIG. 5.

An input signal applied to an input terminal E is supplied to a terminal 1 via a capacitor $C_1$ and a series resistor $R_V$ of relatively high value. From the terminal 1 the signal passes to the high impedance side of an impedance transformer 2 from which it is supplied in low-impedance form at terminal 3 to a band-stop filter 4.

If the signal is passed by the band-stop filter 4, it reaches its output point 5 and a further impedance transformer 6 whose low-impedance output 7 feeds it and through a feedback conductor 8 to an input 9 of a differential current source 10. The signal is inverted in the current source 10 and is returned via the output 11 thereof to the point 1 at which it balances out the input signal because of the inversion of the output signal from the current source 10. A signal admitted by the filter 4 is therefore canceled and blocked from the entire system. It cannot be obtained either from the terminal 1 on the high-impedance side of the impedance transformer 2 or on its low-impedance side 12 to which an output terminal A is connected via a capacitor $C_2$.

However, if an input signal is blocked by the band-stop filter 4 it may be readily obtained either at the terminal 1 or more readily, from the terminal 12 via the terminal A.

It should be mentioned that it is not absolutely necessary for the operation of the circuit that filter 4 is preceded or followed by an impedance transformer 2 or 6, respectively. The terminal point 1 may also be directly connected to the band-stop filter and the feedback conductor 8 may be directly connected to the point 5. In all cases the characteristic of filter 4 is reversed in this way. The use of a current source by contrast to the use of an inverter offers the advantage that the signal passed by the filter 4 is supplied to the terminal point 1 without voltage drop despite the resultant high resistance. The wattless current which passes through the current source 10 is relatively low under these conditions.

A double T-filter is advantageously used as the band-stop filter 4. Such filters are well known and it is therefore not necessary for the filter 4 to be described in detail. Double-T filters have a high degree of accuracy so that the use of such a filter and reversal of its characteristics enables a selective attenuation by more than 50 dB to be obtained. Input-frequency fluctuations of ± 5 percent result in an output voltage-change of −20 dB.

Power supply 10, in a preferred embodiment, comprises two constant-current sources which are disposed symmetrically relative to points 9, 11. Each of the constant-current sources is provided in conventional manner with a transistor $T_1$, $T_1'$ in common-emitter connection. The transistors $T_1$, $T_1'$ are also provided in conventional manner with a separate base voltage divider one branch of which is formed by a resistor $R_1$ or $R_1'$ and whose other branch is formed by a diode $D_1$ or $D_1'$, the diode being followed by a resistor $R_2$ or $R_2'$.

By contrast to the conventional construction, the collector of each common-emitter transistor $T_1$ or $T_1'$ is connected to the emitter of a respective common-base transistor $T_2$ or $T_2'$. This uitlizes the fact that transistors in common-base connection have a particularly flat characteristic so that voltage fluctuations have practically no effect. Resistors $R_3$, $R_3'$ are connected to the bases of the transistors $T_2$, $T_2'$, the two transistors $T_2$, $T_2'$ having a Zener diode Z in common which ensures that a defined operating point is maintained. As already mentioned, the output signal of the differential current source 10 is supplied from junction 11 to the terminal point 1 in a form which is inverted relative to that of the input signal at point 9.

Thus, the input signal appears at the terminal point 1 only if it is stopped by the filter 4; otherwise the input signal is canceled by the negative feedback via loop 4, 6, 8, 10. All signals which are stopped by the filter 4 therefore appear at point 1 and all signals which are passed by the filter 4 are suppressed.

The upstream impedance transformers 2 and the downstream impedance transformer 6 conventionally comprise each a differential amplifier with two input transistors $T_3$, $T_4$, the collector of transistor $T_4$ being connected to a control transistor $T_5$ which is followed by an output transistor $T_6$. As may be seen, the transistors $T_5$, $T_6$ are connected as emitter followers in a Darlington circuit. In order to increase the input impedance, the emitter of the output transistor $T_6$ is directly connected to the base of the input transistor $T_4$.

A further improvement may be obtained if the base of the input transistor $T_4$ is connected to a pair of cascaded diodes $D_2$ followed by a resistor $R_4$. An emitter resistor $R_5$, which is common to the input transistors $T_3$, $T_4$, will then not be connected to ground by contrast to the conventional construction but to a junction point between the cascaded diodes $D_2$ and the resistor $R_4$. This ensures in a simple manner that the emitter current of the input transistors $T_3$, $T_4$ remains constant without calling for a constant-current source. The voltage drop across the emitter resistor $R_5$ does not vary even with large changes of input voltage developed in amplified form across the resistor $R_4$.

The system just described provides numerous and different facilities. The radiation of the image-reproducing apparatus may vary widely and accordingly it may be necessary to use diverse types of radiation transducers. For example, light of specific spectral composition emitted by a television receiver may be supplied through a filter to a photoelectric transducer.

It is equally possible to utilize the ultrasonic oscillations emitted by a television apparatus to detect the operating state thereof. Magnetic fields or the like may also be considered. The operating state of the apparatus is recognized in all cases and the intermission light, curtain or the like controlled accordingly.

What is claimed is:

1. A monitoring system for controlling a load in response to changes in the operating condition of an apparatus producing intermittent radiation interrupted at a predetermined frequency, comprising:
photoelectric transducer means positioned in the path of said light waves for generating a signal voltage varying with the frequency of interruption thereof;
frequency-discriminating means connected to said transducer means for selectively passing the signal voltage varying at said frequency of interruption, said frequency discriminating means comprising a band pass circuit including a negative-feedback loop, said negative-feedback loop comprising a band-stop filter having a stop band including said frequency of interruption whereby said band-pass circuit passes said frequency of interruption said band-stop filter having a stop band in a range different from that of said pass band for eliminating extraneous frequencies other than said frequency of interruption; and
load-control means including a switching circuit connected to said frequency-discriminating means for actuation by said signal voltage in the absence of said intermittent radiation.

2. A system as defined in claim 1 wherein said pass band lies in the range of substantially 45 to 80 Hz.

3. A system as defined in claim 1 wherein said apparatus producing intermittent radiation is located in a room provided with a source of artificial ambient illumination independent of said apparatus, said switching circuit comprising a light switch responsive to said signal voltage for reducing said ambient illumination.

4. A system as defined in claim 3, further comprising a time-constant network in series with said light switch.

5. A system as defined in claim 3 wherein said source of artificial ambient illumination is energized by an alternating supply voltage of predetermined mains frequency, said stop band including a frequency equal to twice said mains frequency.

6. A system as defined in claim 1 wherein said negative-feedback loop includes a constant-current source triggerable by the output of said band-stop filter.

7. A system as defined in claim 6 wherein said constant-current source comprises an amplifier stage with two symmetrical branches each including a pair of cascaded transistors.

8. A system as defined in claim 7 wherein the transistors of each pair comprise a common-emitter first transistor and a common-base second transistor.

9. A system as defined in claim 8, further comprising a Zener diode interposed between the bases of said common-base second transistors.

10. A system as defined in claim 1 wherein said discriminating means comprises a first impedance transformer, connected across said negative-feedback loop, and a second impedance transformer inserted in said negative-feedback loop downstream of said band-stop filter.

11. A system as defined in claim 10 wherein each of said impedance transformers comprises a differential amplifier.

12. A system as defined in claim 11 wherein each of said impedance transformers comprises a Darlington transistor combination in the output of said differential amplifier.

13. A system as defined in claim 11 wherein said differential amplifier includes an output transistor with a base, an emitter and a resistive connection between a supply terminal and said base, said connection including diode means inserted between said base and said emitter.

* * * * *